US006971362B2

(12) United States Patent
Gunji et al.

(10) Patent No.: US 6,971,362 B2
(45) Date of Patent: Dec. 6, 2005

(54) THREADED FASTENER FOR AN INTERNAL COMBUSTION ENGINE, AND INTERNAL COMBUSTION ENGINE INCORPORATING SAME

(75) Inventors: Toru Gunji, Saitama (JP); Hiroyuki Kawakubo, Saitama (JP); Hisao Otsuka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/791,672

(22) Filed: Mar. 2, 2004

(65) Prior Publication Data

US 2004/0206328 A1    Oct. 21, 2004

(30) Foreign Application Priority Data

Mar. 19, 2003  (JP)  .............................. 2003-074841

(51) Int. Cl.[7] .............................. F02F 7/00; F16B 35/00
(52) U.S. Cl. .................. 123/195 R; 411/392; 411/395
(58) Field of Search ..................... 123/195 R, 195 AC, 123/195 H, 195 HC; 411/392, 395

(56) References Cited

U.S. PATENT DOCUMENTS 1,784,377 A * 12/1930 Moore ........................ 411/395
2,111,796 A * 3/1938 Meader ....................... 411/395
2,542,377 A * 2/1951 Turkish ....................... 411/395
6,374,815 B1 * 4/2002 Ness et al. .................. 123/572

FOREIGN PATENT DOCUMENTS

JP         3016308        10/1989
JP         1-143418        7/1995

* cited by examiner

Primary Examiner—Andrew M. Dolinar
(74) Attorney, Agent, or Firm—Carrier, Blackman & Associates, P.C.; William D. Blackman; Joseph P. Carrier

(57) ABSTRACT

A threaded fastener is configured to reduce stress experienced at a female threaded portion of a hole formed in an engine block, when the threaded fastener is inserted therein, and when an axial load is applied thereto. In a particular application, a crankshaft is supported between a top supporting wall of a crankcase and a bottom supporting wall of a main cap. The inventive bolt includes a hollowed-out male threaded portion, which fits into a hole in the top supporting wall. The male threaded portion includes an elastically deformable low-rigidity portion, in which a cylindrical hole is concentrically formed. The maximum allowable stress of the top supporting wall is less than that of the bolt, due to material considerations. The low-rigidity portion is placed overlapping the female threaded portion in the axial direction, and since it is elastically deformable, it helps alleviate the stress experienced by the female threaded portion.

11 Claims, 5 Drawing Sheets

THREADED FASTENER FOR AN INTERNAL COMBUSTION ENGINE, AND INTERNAL COMBUSTION ENGINE INCORPORATING SAME

CROSS-REFERENCE TO RELATED APPLICATIONS

The present application claims priority under 35 USC 119 based on Japanese patent application No. 2003-074841, filed Mar. 19, 2003.

BACKGROUND OF THE INVENTION

1. Field of the Invention

The present invention relates to a threaded fastener for insertion into a threaded hole to connect components of an internal combustion engine, and to an internal combustion engine in which the fastener is used. More particularly, the present invention relates to a threaded fastener including a cylindrical shaft with an elastically deformable low-rigidity portion adapted to withstand combustion-related axial loading.

2. Description of the Background Art

Many different designs for bolts and other threaded fasteners are known, and many such fasteners are commercially available. Conventional fasteners include bolts such as the one disclosed in, for example, Japanese Utility Model No. 3016308. In this known bolt used for fastening two members together, a tip portion of a threaded shaft is adapted to be screwed into a threaded through-hole formed in a receiving member. A hexagonal cavity is formed inside the threaded shaft of the bolt, and an Allen wrench, or similar tool, can be inserted into the cavity when needed.

In the event that the bolt breaks off at the threaded shaft, the broken shaft may be unscrewed by inserting a suitable tool into the cavity from the opening of the threaded hole, thereby allowing removal of the broken shaft from the threaded hole.

In the technology disclosed in Japanese Utility Model No. 3016308, the cavity is made in a hexagonal shape, in order to engagingly receive the tool therein. Further, in the reference, it is not clear whether or not an external force is applied to the member in which the threaded hole is formed, and the relationship between the allowable stress of the member to be fastened and the allowable stress of the bolt is not clear.

Hence, the technology of the above reference does not take into account the reduction of a concentrated stress caused at the female threaded portion into which the tip portion of the threaded shaft is screwed, at the time when an axial load based on the external force is applied to the bolt. In addition, according to the teachings of this reference, the radial thickness of the threaded shaft having the cavity formed therein is not uniform in a peripheral direction.

Further, as described in, for example, microfilm disclosed in Japanese Utility Model Application No. 63-39229 (Japanese Unexamined Utility Model Publication No. 1-143418), it is known that in the case of a bolt for fastening a member to which an external force is applied, when an axial load is applied to the bolt, based on the external force applied to the member, a concentrated stress is caused at a female threaded portion of a hole formed in the member into which the tip portion of the male threaded portion is screwed.

SUMMARY OF THE INVENTION

The present invention has been made in view of the circumstances described above. It is an object of the present invention to provide an improved bolt designed for reducing a concentrated stress experienced at a female threaded portion of a hole formed in a member to be fastened, when an external force is applied thereto via application of an axial load to the bolt.

It is another object of the present invention to maintain or enhance the strength of the constituent member which receives the bolt, in a case where the inventive bolt hereof is used in an internal combustion engine.

In one illustrative embodiment of the invention, a specialized bolt is provided for insertion into a threaded hole formed in a constituent member of an internal combustion engine, to which a combustion load is axially applied via the bolt.

A first aspect of the present invention relates to a bolt for fastening a first member to a second member, the bolt including a male threaded portion for insertion into a female threaded portion of a hole formed in the first member to be fastened. When using a bolt according to the first aspect, an axial load is applied to the bolt, based on an external force applied thereto, and the load is transferred to the first member via the bolt.

In the bolt according to the first aspect hereof, the male threaded portion is provided with a low-rigidity portion in which a hollow cylindrical bore is formed, concentric with the center axis of the male threaded portion and substantially circular in a cross section. In use, the low-rigidity portion of the fastener contacts the first member at a position overlapping a screwed portion, where the male threaded portion is screwed into the female threaded portion in an axial direction.

According to this embodiment of the present invention, in the low-rigidity portion of the male threaded portion in which the hollow portion is formed, its rigidity is reduced as compared with a case where the male threaded portion is solid. Hence, when the axial load is applied to the bolt on the basis of the external force applied to the first member to be fastened, the low-rigidity portion is elastically deformed with relative ease, so a load applied to the screw thread of a screwed end portion from a screw thread of the male threaded portion can be relieved.

In addition, since the hollow portion is substantially circular in cross section, the load applied to the screw thread of the screwed end portion, from the screw thread of the male threaded portion, is relieved uniformly in the peripheral direction with respect to the screwed end portion.

As a result, according to the first aspect of the present invention, the following effect is produced. That is, since the load which is applied to the screw thread of the screwed end portion of the threaded hole, from the screw thread of the bolt to which the axial load based on the external force applied to the first member to be fastened is relieved, a concentrated stress, which would otherwise be caused at a root-of-threaded portion formed in the root of thread of the screwed end portion, is reduced.

Further, since the concentrated stress is reduced uniformly in the peripheral direction of the screw thread of the screwed end portion, the strength of the first member to be fastened can be easily maintained.

The present invention, according to a second aspect hereof, provides an internal combustion engine in which a crankshaft is rotatably supported by a first bearing portion provided on a crankcase, and a second bearing portion fastened to the first bearing portion. The engine includes a bolt having a male threaded portion screwed into a female threaded portion of a threaded hole formed in the first bearing portion, wherein the allowable stress of the first bearing portion is less than the allowable stress of the bolt.

During operation of the engine, an axial load based on a combustion load applied to the first bearing portion is transferred to the bolt, wherein the male threaded portion includes a low-rigidity portion, in which a hollow portion concentric with the center axis of the male threaded portion and substantially circular in cross section is formed. The hollow portion of the bolt is formed at a position overlapping the screwed end portion of a screwed portion where the male threaded portion is screwed into the female threaded portion in an axial direction.

According to this second aspect of the present invention, rigidity is reduced in the low-rigidity portion of the bolt, and this low-rigidity portion is screwed into the threaded hole of the first bearing portion to which combustion load is applied through a crankcase. Hence, when the axial load, based on the combustion load, is applied to the bolt for fastening the second bearing portion to which the combustion load is applied via the first bearing portion and the crankshaft, the same operation is effected between the low-rigidity portion and the screwed end portion as in the first aspect hereof.

Further, since the hollow portion is formed in the bolt, for relieving load applied to the screwed end portion from the male threaded portion, the hollow portion of the threaded hole does not need to be made larger, or can be made as small as practically feasible.

As a result, according to the embodiment of the present invention according to the second aspect hereof, the following effect is produced. That is, since the load applied to the screw thread of the screwed end portion from the screw thread of the bolt is relieved, which axial load is based on the combustion load applied to the first bearing portion, the concentrated stress, which would otherwise have been caused at the root-of-threaded portion in the screwed end portion, is reduced.

Further, since the concentrated stress is reduced uniformly in the peripheral direction of the male threaded portion, the strength of the female threads formed in the first bearing portion is easily maintained. Still further, in order to reduce the concentrated stress, the hollow portion of the threaded hole formed in the first bearing portion does not need to be made larger or can be made as small as possible, so the first bearing portion is maintained or increased in strength.

Hence, the desired strength of the first bearing portion can be secured without increasing the size and weight of the first bearing portion, and by extension, the internal combustion engine can be made efficiently.

The embodiment of the present invention according to a third aspect hereof is an internal combustion engine of the type in which a cylinder block is fastened to a crankcase rotatably supporting a crankshaft, with a bolt having a male threaded portion screwed into a female threaded portion in a threaded hole formed in the crankcase, wherein the allowable stress of the crankcase is less than the allowable stress of the bolt.

During operation of the engine, an axial load based on an combustion load applied to the crankcase is transferred to the bolt. The male threaded portion of the bolt includes a low-rigidity portion, in which a hollow portion, concentric with the center axis of the male threaded portion and substantially circular in a cross section is formed. The hollow portion of the bolt is formed at a position overlapping the screwed end portion of a screwed portion where the male threaded portion is screwed into the female threaded portion in an axial direction.

According to this invention, rigidity is reduced in the low-rigidity portion of the bolt screwed into the threaded hole of the crankcase to which combustion load is applied, as is the case with the bolt according to the first aspect hereof. When the axial load, based on the combustion load, is applied to the bolt for fastening the crankcase and the cylinder block, the same operation is effected, between the low-rigidity portion and the screwed end portion, as in the first aspect hereof.

Further, the hollow portion is formed in the bolt for relieving the load applied to the screwed end portion from the male threaded portion, so the hollow portion of the threaded hole does not need to be made larger, or can be made as small as possible.

As a result, according to third aspect of the invention, the following effect is produced. That is, since the load applied to the screw thread of the screwed end portion from the screw thread of the bolt to which the axial load based on the combustion load applied to the crankcase is relieved, the concentrated stress caused at the root-of-threaded portion in the screwed end portion is reduced.

Further, since the concentrated stress is reduced uniformly in the peripheral direction of the male threaded portion, the strength of the crankcase is easily maintained. Still further, in order to reduce the concentrated stress, the hollow portion of the threaded hole formed in the crankcase does not need to be made larger or can be made as small as possible, and the strength of the crankcase maintained or increased.

Hence, the desired strength of the crankcase can be secured without increasing the size and weight of the crankcase, and by extension, the internal combustion engine can be made efficiently.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Several embodiments of the present invention will be described herein, with reference to FIGS. 1 through 5. The selected embodiments and working examples are intended to illustrate, rather than limit the present invention.

Figure 1:
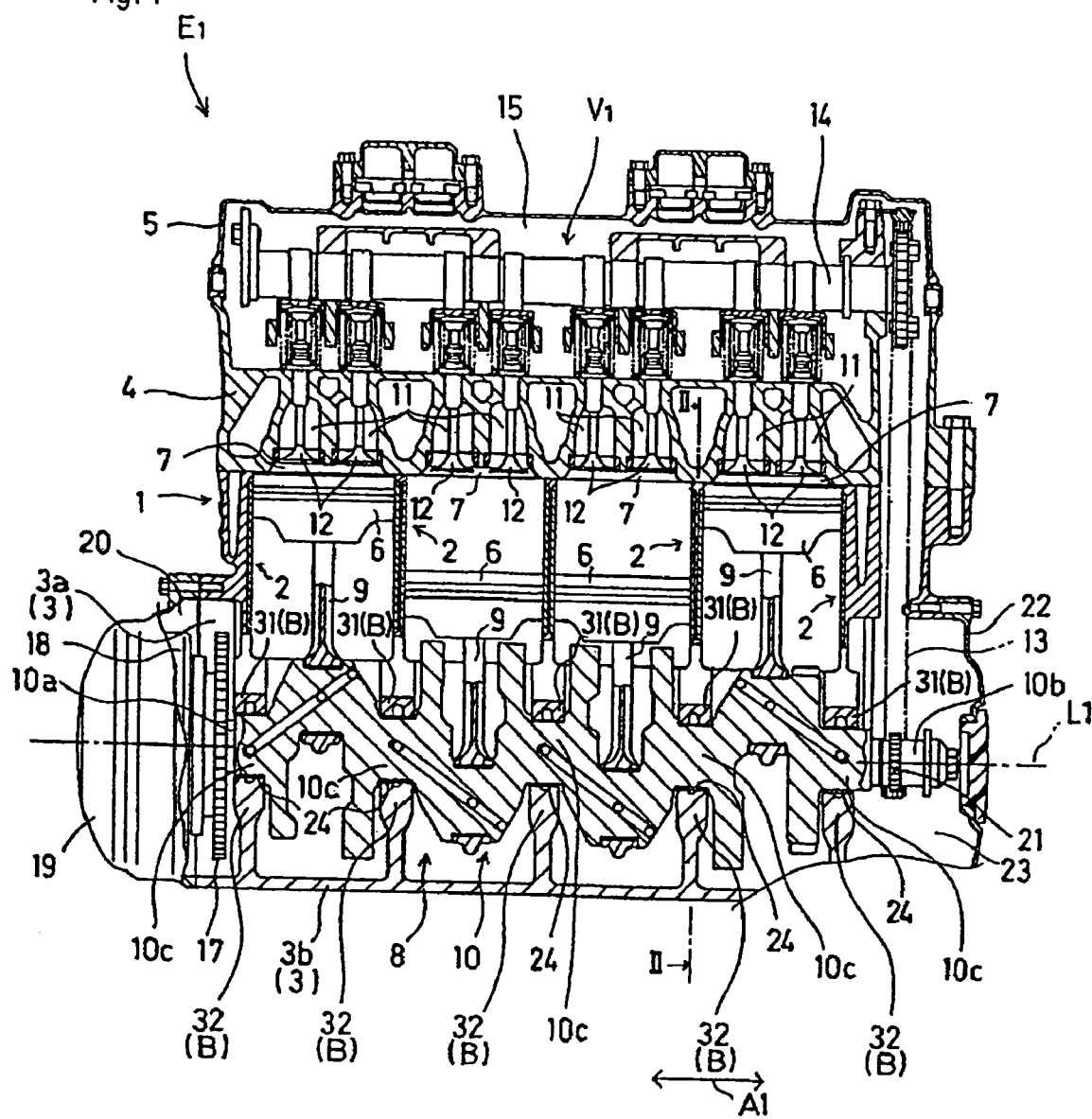
FIG. 1 is a longitudinal cross-sectional view of an internal combustion engine, in which crankshaft journal bolts in accordance with a first embodiment of the present invention are used.
Figure 2:
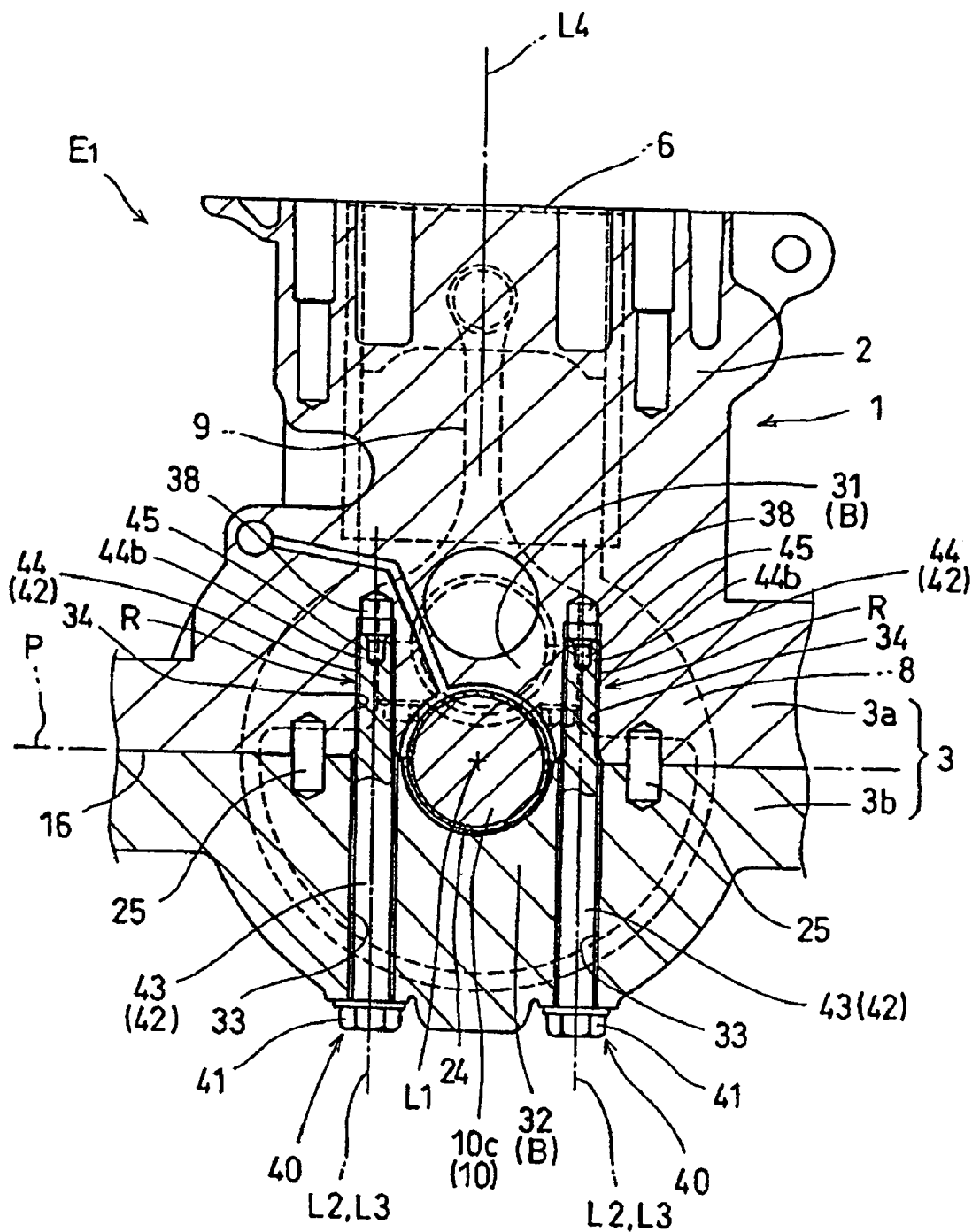
FIG. 2 is a partial transverse cross-sectional view of the engine of FIG. 1, taken along the line II—II in FIG. 1.
Figure 3:
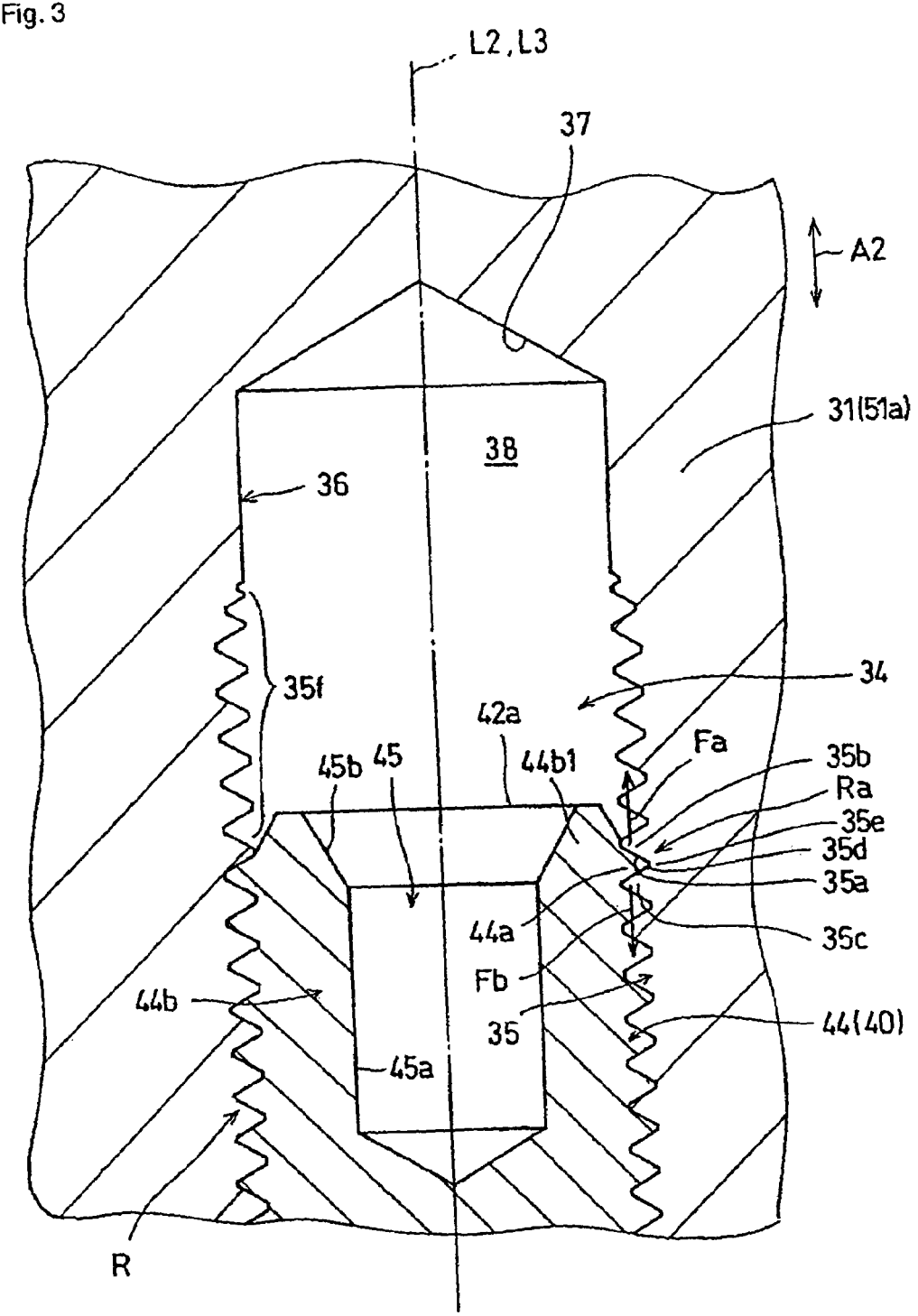
FIG. 3 is an enlarged cross-sectional detail view of a selected portion of the engine of FIG. 2.

FIGS. 1 to 3 are illustrations related to a first embodiment of the present invention. Referring to FIG. 1 and FIG. 2, an internal combustion engine $E_1$ is shown, in which journal bolts 40 (FIG. 2) are used, in accordance with a first aspect of the present invention. The engine $E_1$ is a DOHC in-line 4-cylinder 4-stroke internal combustion engine, and is adapted to be mounted on a motorcycle frame, or in a similar application.

The internal combustion engine $E_1$ includes an engine body assembled from a plurality of constituent members, including a cylinder block 1 in which four cylinders 2 are integrally formed. The engine $E_1$ also includes a bottom half crankcase 3b joined to a top half crankcase 3a with a large number of bolts. The top half crankcase 3a consists primarily of a skirt portion which is a bottom portion of the cylinder block 1.

The internal combustion engine $E_1$ also includes a cylinder head 4, joined to the top end portion of the cylinder block 1, and a valve cover 5 joined to the top end portion of the cylinder head 4.

A piston 6 is fitted inside each cylinder 2, in such a way that it can reciprocate therein, and a combustion chamber 7 is formed between the cylinder head 4 and the top of the piston 6.

A crankshaft 10 is received in a crank chamber 8 formed by a crankcase 3, constructed of the top half crankcase 3a and the bottom half crankcase 3b. The crankshaft 10 is rotatably supported by the crankcase 3. The respective pistons 6 are each connected to the crankshaft 10 via the respective connecting rods 9, and the reciprocating motions of the pistons 6 are converted into the rotary motion of the crankshaft 10.

On the other hand, for each combustion chamber 7, the cylinder head 4 is provided with a pair of intake valves 12 that selectively opens or closes, a pair of intake ports 11 opening to the combustion chamber 7, respectively, and a pair of exhaust valves (not shown) that opens or closes a pair of exhaust ports (not shown) opening to the combustion chamber 7, respectively.

The respective intake valves 12 and the exhaust valves are opened or closed at predetermined times in synchronization with the rotation of the crankshaft 10 by a valve system $V_1$ having an intake camshaft 14 and an exhaust camshaft (not shown) rotated at a rotary speed of ½ times the rotary speed of the crankshaft 10, in operative association with the crankshaft 10 via a transmission mechanism having a timing chain 13. This valve system $V_1$ is arranged in a valve system chamber 15 formed of the cylinder head 4 and the valve cover 5.

In each cylinder 2, an air-fuel mixture formed in an intake unit (not shown) is sucked into the combustion chamber 7 from the intake port 11 through the pair of opened intake valves 12 in an intake stroke, in which the piston 6 is moved down. The air-fuel mixture in the cylinder 2 is then compressed by the piston 6, moved up in a compression stroke, and is then ignited and burned by a spark generated by an ignition plug.

After ignition, in an expansion stroke, the piston 6 is forced down by the pressure of rapidly expanding combustion gas. The downward movement of the piston rotates the crankshaft 10 via the connecting rod 9. The combustion gas is discharged as exhaust gas through the exhaust port from the combustion chamber 7 past the pair of opened exhaust valves in an exhaust stroke and further is discharged to the outside via an exhaust system (not shown).

The crankshaft 10 has a rotary center line L1 located on a substantially horizontal plane P (FIG. 2) including the mating faces 16 of the top half crankcase 3a and the bottom half crankcase 3b. The crankshaft 10 is rotatably supported at a plurality of journal portions 10c, in this embodiment, five journal portions 10c by a bearing unit constructed of bearing portions B provided at intervals in a direction A1 of the rotary center line L1, and of the same number as journal portions 10c.

A driven gear 17, which is connected to and driven by a starting motor via a one-way clutch, and the rotor of an AC generator 18 are mounted in this order from the crankcase side on one end 10a of the crankshaft 10 protruding outside the crank chamber 8 on the one side of the crankcase 3. The driven gear 17 and the AC generator 18 are received in a receiving chamber 20 formed of the crankcase 3 and a cover 19 joined to the crankcase 3.

A driving sprocket 21, over which the timing chain 13 is looped, is mounted on the other end 10b of the crankshaft 10 protruding outside the crank chamber 8 on the other side of the crankcase 3. The driving sprocket 21 is received in a transmission chamber 23 formed of the crankcase 3 and a cover 22 joined to the crankcase 3.

Each bearing portion B, which rotatably supports the journal portion 10c via a bearing metal 24 of a main bearing arranged on the outer periphery of the journal portion 10c, includes a top journal supporting wall 31, as a first bearing portion which is provided on the top half crankcase 3a, and a bottom journal supporting wall 32, as a second bearing portion which is provided on the bottom half crankcase 3b.

The bottom journal supporting wall 32 is fastened to the top journal supporting wall 31 with a pair of journal bolts 40, arranged at positions between which the journal portion 10c is sandwiched. The top journal supporting wall 31 is integrally molded with the top half crankcase 3a, and the bottom journal supporting wall 32 is integrally molded with the bottom half crankcase 3b. A reference numeral 25 designates a pin for aligning and positioning both of the journal supporting walls 31, 32 relative to one another.

As shown in FIG. 2, in each bearing portion B, each journal bolt 40 includes a head portion 41 and a shaft portion 42. The head portion 41 is provided for abutting against a fastening face formed on the bottom surface of the bottom journal supporting wall 32. The shaft portion 42 is passed through a through hole 33, formed in the bottom journal supporting wall 32, and is screwed into a female threaded hole 34 formed in the top journal supporting wall 31.

In order to reduce the weight of the internal combustion engine $E_1$, the cylinder block 1 and the bottom half crankcase 3b are molded of a molding material made of a light metal base alloy, for example, aluminum base alloy. The allowable stresses of the cylinder block 1 and the bottom half crankcase 3b are set at a value less than the allowable stress of the journal bolt 40 molded of a different molding material, for example, made of an iron base alloy.

Referring to FIG. 3 in combination with FIG. 2, the threaded hole 34 has a center axis L2 orthogonal to the mating face 16, and has a closed end defined by an innermost surface 37. The threaded hole 34 also has a female threaded portion 35 where a female thread is formed, and a non-threaded portion 36 between the female threaded portion 35 and the innermost surface 37 of the threaded hole 34.

The shaft portion 42 of the journal bolt 40 has a center axis L3, orthogonal to the mating face 16, and coinciding with the axis L2 of the threaded hole 34. The shaft portion 42 of the journal bolt 40 also has a cylindrical portion 43 and a male threaded portion 44 that is closer to the tip end surface 42a of the shaft portion 42 than the cylindrical portion 43 and in which a male thread is formed.

In a state where the top journal supporting wall 31, as a first member to be fastened, is fastened in each bearing portion B to the bottom journal supporting wall 32 as a second member to be fastened with the pair of journal bolts 40, the male threaded portion 44 of each journal bolt 40 is screwed into the female threaded portion 35 of the threaded hole 34, this portion being referred to as a screwed portion R. In this embodiment, the screwed portion R in the female threaded portion 35 is a portion of the female threaded portion 35.

As a result, a portion of the female threaded portion 35, closer to the innermost surface 37 than the tip end surface 42a of the male threaded portion 44, becomes a non-screwed portion 35f where the male threaded portion 44 is not screwed into the female threaded portion 35. A hollow portion 38, consisting of a space that is not occupied by the journal bolt 40, is formed in the threaded hole 34 by the non-screwed portion 35f and the non-threaded portion 36.

The male threaded portion 44 has a hole 45 formed therein, defining a hollow portion in the tip of the male threaded portion 44. The hole 45 is formed at a position overlapping the screwed end portion Ra of the screwed portion R in the female threaded portion 35.

In other words, a portion which forms a thread groove 35a in which one pitch of screw thread 44a at the tip of the male threaded portion 44 in the screwed portion R is screwed, and includes screw threads 35b, 35c which are located on both sides across the thread groove 35a in a direction of the center axis L2 (which is the same direction as an axial direction A2 to be described later). A root-of-threaded portion 35e forms a root of thread 35d in the direction A2 of the center axis L3, that is, in an axial direction A2.

The hole 45 is a cylindrical hole having a substantially circular cross-sectional shape, and a closed end defined by the innermost surface 37. The hole 45 is formed concentrically with the center axis L3 of the male threaded portion 44, by boring from the tip end surface 42a, casting, or forging.

The hole 45 has a depth extending in the axial direction A2 over the screwed end portion Ra. Further, a portion of the hole 45, overlapping the screwed end portion Ra in the axial direction A2, has a tapered inner peripheral surface expanding toward the tip end surface 42a, and hence, forms a large diameter portion 45b having a larger diameter than a cylindrical portion 45a, which has a cylindrical inner peripheral surface.

Hence, the thickness (thickness in the radial direction) of the male threaded portion 44, at the large diameter portion 45b, becomes less than the thickness of the cylindrical portion 45a. Here, the length of the cylindrical portion 45a and the thickness of a thin portion 44b1 of a portion of the male threaded portion 44, where the large diameter portion 45b is formed, are set at suitable values from the viewpoint of the degree of reduction in concentrated stress and securing a fastening strength.

In the male threaded portion 44, a portion where this hole 45 is formed is reduced in rigidity as compared with a solid portion where the hole 45 is not formed, and hence, forms a low-rigidity portion 44b. When an axial load in the axial direction A2 is applied to the journal bolt 40, the low-rigidity portion 44b is more easily elastically deformed, in the axial direction A2, than the solid portion.

Next, the operation and effect of the first embodiment constructed in the above manner will be described.

When the internal combustion engine $E_1$ is operated, a combustion load, caused by the pressure of the expanding gases resulting from combustion of the air-fuel mixture in the combustion chamber 7, is applied upwardly in FIG. 2 to the cylinder block 1 joined to the cylinder head 4.

At the same time, the combustion load is applied downwardly against the crankshaft 10, rotatably supported by the respective bearing portions B via the pistons 6 and the connecting rods 9, and further downward in FIG. 2 to the bottom half crankcase 3b.

At the respective bearing portions B, by the combustion load, an upward load is applied to the top journal supporting wall 31, integral with the cylinder block 1. A downward load is applied to the bottom journal supporting wall 32, integral with the bottom half crankcase 3b.

On the basis of the combustion load, which is an external force applied to the top journal supporting wall 31, the reactive force of the combustion load is applied downwardly, as an axial load, to the pair of journal bolts 40 that fasten the top journal supporting wall 31 and the bottom journal supporting wall 32 together. At the same time, on the basis of the combustion load applied to the bottom journal-supporting wall 32, an axial load in the same direction as the above reactive force is applied to the pair of journal bolts 40.

For this reason, as shown in FIG. 3, in the female threaded portion 35, an upward load Fa is applied to the screw thread 35b, closer to the non-screwed portion 35f of the screwed end portion Ra, and a downward load Fb is applied to the screw thread 35c opposite the screw thread 35b across the screwed end portion Ra from the screw thread 44a of the male threaded portion 44. As a result of the above-described forces, it will be understood that a concentrated stress is caused at the root-of-threaded portion 35e of the screwed end portion Ra.

At this time, in the male threaded portion 44, the low-rigidity portion 44b having the hole 45 which is formed concentrically with the center axis L3 of the male threaded portion 44, and has a circular cross section, is formed at the position where the male threaded portion 44 overlaps the screwed end portion Ra in the axial direction A2, and the screw thread 44a is formed at the low-rigidity portion 44b.

Hence, in the low-rigidity portion 44b, rigidity is reduced as compared with a case where the male threaded portion 44 is solid. For this reason, when an axial load, based on the combustion load, is applied to the journal bolt 40, the thinner low-rigidity portion 44b is elastically deformed with relative ease, to relieve the load Fb applied to the screw thread 35c of the screwed end portion Ra from the screw thread 44a of the male threaded portion 44, thereby reducing the concentrated stress caused at the root-of-threaded portion 35e of the screwed end portion Ra.

Further, since the hole 45 is substantially circular in cross section, the load Fb applied to the screw thread 35c of the screwed end portion Ra from the screw thread 44a of the male threaded portion 44 is uniformly relieved in the peripheral direction with respect to the screwed end portion Ra, to reduce the concentrated stress uniformly in the peripheral direction of the screw thread 35c of the screwed end portion Ra. Hence, this helps to maintain and preserve the strength of the top journal supporting wall 31.

Still further, the hole 45 that is formed in the journal bolt 40, provides a means for relieving the load Fb applied to the screwed end portion Ra from the male threaded portion 44. Hence, the hollow portion 38 of the threaded hole 34, which is formed in the top journal supporting wall 31, having less allowable stress than the allowable stress of the journal bolt 40 so as to reduce the concentrated stress, does not need to be enlarged, and/or can be made as small as possible.

For this reason, this can prevent a decrease in the strength of the top journal supporting wall 31 or enhance the strength and hence can secure the desired strength of the top journal supporting wall 31 without increasing the size and weight of the top journal supporting wall 31 and by extension the internal combustion engine $E_1$.

In addition, since the screw thread 44a is formed at the thin portion 44b1 of the low-rigidity portion 44b, the screw thread 44a is more easily elastically deformed. Moreover, since the other portion of the low-rigidity portion 44b is thicker than the thin portion 44b1, the other portion can relieve the load Fb applied to the screw thread 44a of the male threaded portion 44, and at the same time, secure a desired fastening strength at the screwed portion other than the screwed end portion Ra.

Figure 4:
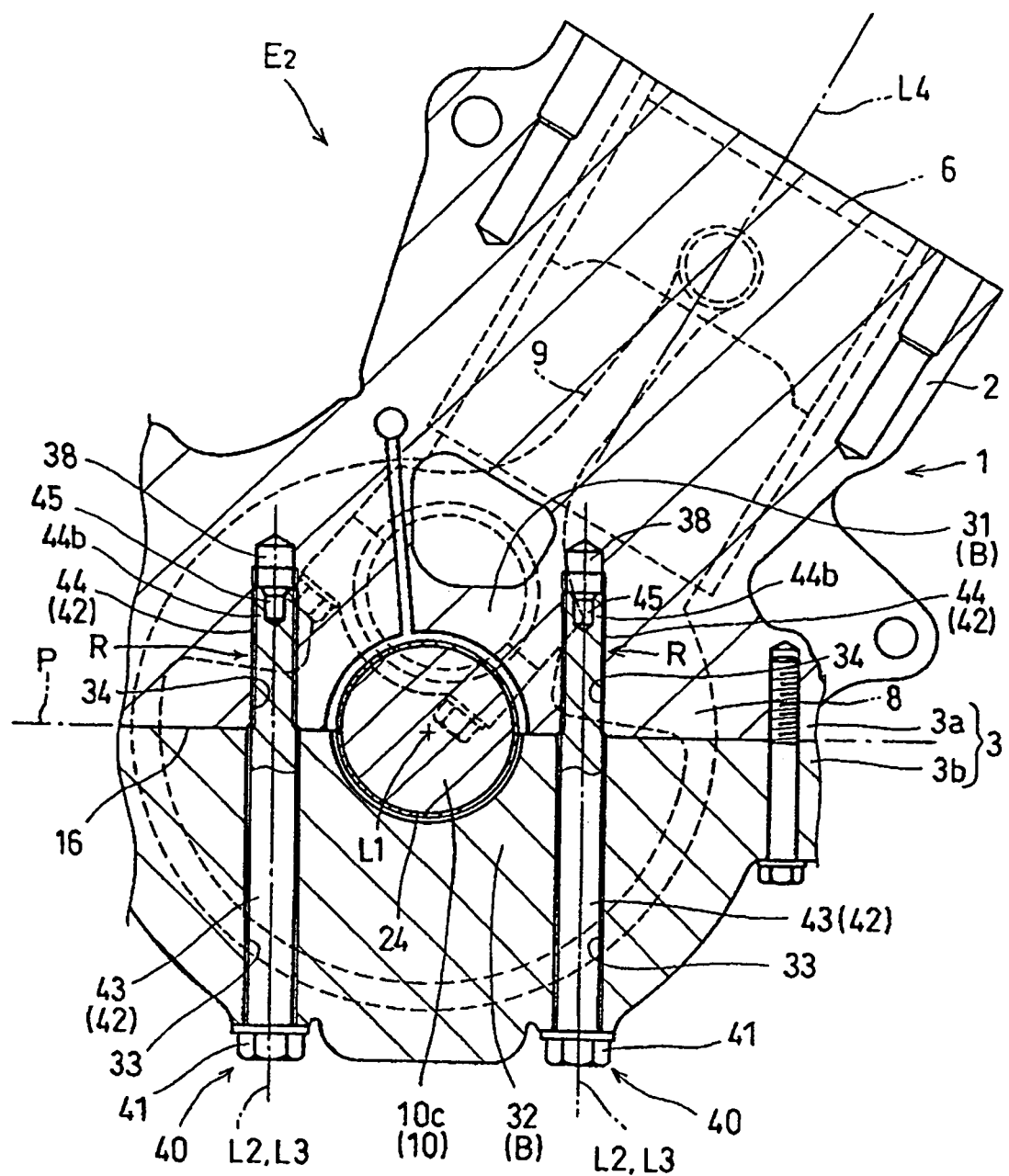
FIG. 4 is a cross-sectional view, corresponding to FIG. 2, of an engine incorporating a bolt and socket according to a second embodiment of the invention.

Next, a second embodiment of the present invention will be described with reference to FIG. 4. This second embodiment is different from the first embodiment of the internal combustion engine $E_1$, having a cylinder center axis L4 orthogonal to a substantially horizontal plane P including the mating face 16, in that the second embodiment is an internal combustion engine $E_2$ having a cylinder axis L4 inclined at an angle with respect to the horizontal plane P, and otherwise has the fundamentally same construction as in the first embodiment.

Hence, the like or corresponding parts of the parts in the first embodiment are designated by the like reference symbols and their concrete descriptions will be omitted. Also this second embodiment can produce the same operation and effect as the first embodiment.

Next, a third embodiment of the present invention will be described with reference to FIG. 5. This third embodiment is an internal combustion engine $E_3$ in which the same hole 45 as in the first embodiment is formed in a stud bolt for fastening a cylinder block 52 to a crankcase 51. For this reason, the same reference symbols as in the first embodiment will be used. If necessary, FIG. 3 is also referred to in combination.

The internal combustion engine $E_3$ in which stud bolts $40_1$, $40_2$ in accordance with the invention are used is an OHV type single cylinder 4-stroke internal combustion engine, provided to be mounted on a vehicle such as a motorcycle.

The internal combustion engine $E_3$ is provided with an engine body constructed of constituent parts of the crankcase 51, the cylinder block 52 and a cylinder head 53 that are mounted in sequence on the top end of the crankcase 51, and a valve cover 54, joined to the cylinder head 53 with bolts or other suitable fasteners.

Figure 5:
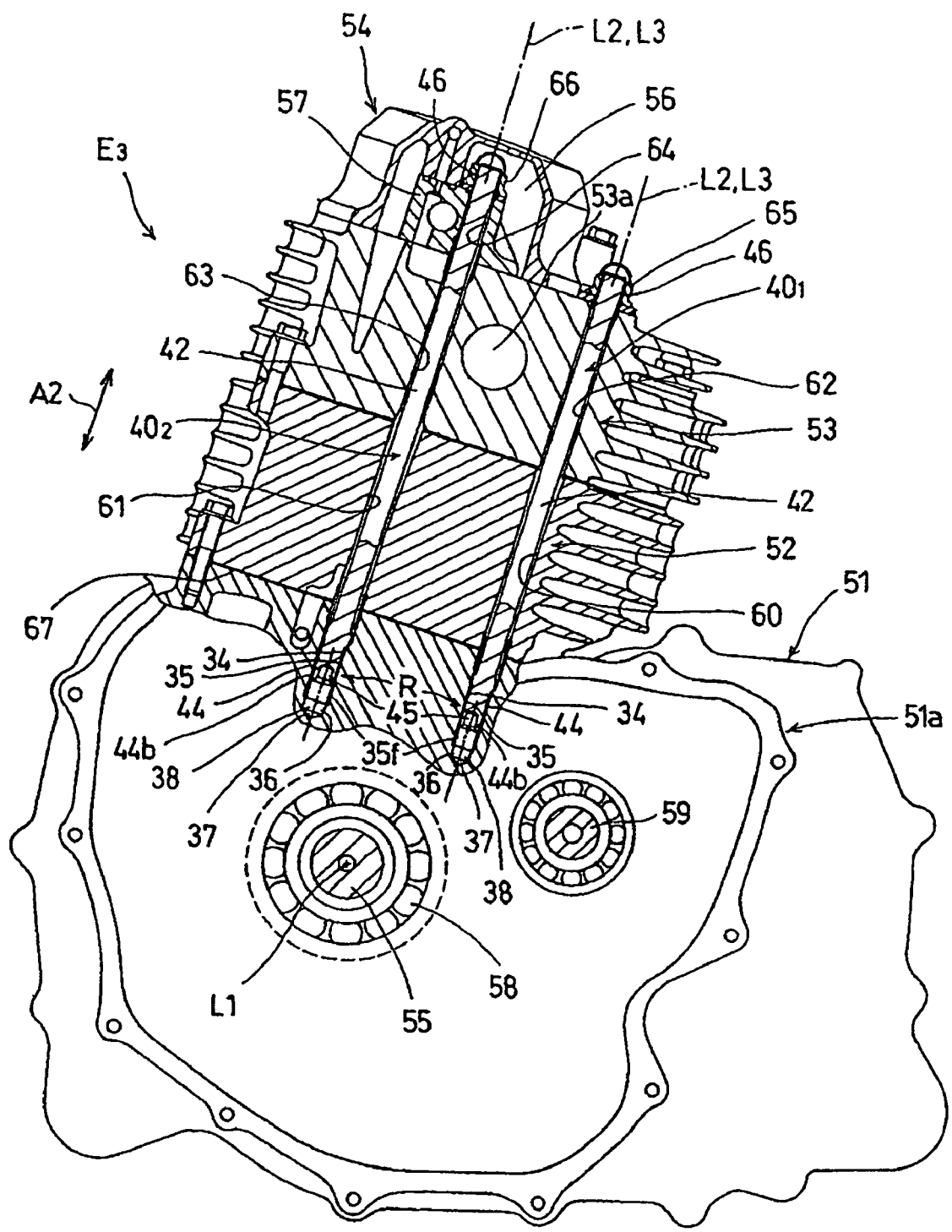
FIG. 5 is a partial cross sectional view of an internal combustion engine according to a third embodiment of the invention, in which stud bolts according to the invention are used.

The crankcase 51, the cylinder block 52, and the cylinder head 53 are fastened into one piece with four stud bolts $40_1$, $40_2$ (two of them are shown in FIG. 5).

As is the case with the first embodiment, a piston is fitted in the cylinder block 52 made of a single cylinder in such a way that it can reciprocate, and a combustion chamber is formed between the cylinder head 53 and the piston. A crankshaft 55 received in a crank chamber formed of the crankcase 51 is rotatably supported by the crankcase 51. The piston is connected to the crankshaft 55 via a connecting rod, and the reciprocating motion of the piston is converted into the rotary motion of the crankshaft 55.

The cylinder head 53 is mounted with an intake valve and an exhaust valve which open or close an intake port and an exhaust port 53a communicating with the combustion chamber, respectively. These intake and exhaust valves are opened or closed at predetermined timings in synchronization with the rotation of the crankshaft 55 by a valve system having a rocker arm received in a valve system chamber 56 formed of the cylinder head 53 and the head cover 54.

The rocker arm is supported by a rocker shaft held by a holder 57 fixed to the cylinder head 53 in such a way as to swing and is swung by a push rod operated by a camshaft rotating in operative association with the crankshaft 55.

An air-fuel mixture formed in the intake unit is sucked into the combustion chamber from the intake port through the opened intake valve in an intake stroke in which the piston is moved down. The air-fuel mixture sucked into the cylinder block 52 is compressed by the piston moved up in a compression stroke and then is ignited and burned by an ignition plug.

The piston is forced down by the pressure of combustion gas in an expansion stroke rotates the crankshaft 55 via the connecting rod. The combustion gas is discharged in an exhaust stroke as exhaust gas through the opened exhaust valve from the combustion chamber to the exhaust port 53a and then is discharged to the outside via an exhaust unit.

The crankcase 51 that rotatably supports the crankshaft 55 via a pair of main bearings each formed of a ball bearing (one main bearing 58 is shown in FIG. 5) is a so-called left/right divided crankcase constructed of a pair of half crankcases which have a mating face including the crankshaft 55 and orthogonal to the rotary center line L1 of the crankshaft 55 (one half crankcase 51 a is shown in FIG. 5).

The crank chamber receives the crankshaft 55 and a transmission having a main shaft connected to and driven by the crankshaft 55 via a starting clutch and a transmission clutch.

Four stud bolts $40_1$, $40_2$ include a pair of first stud bolts $40_1$, for fastening the cylinder block 52 and the cylinder head 53 together to the crankcase 51, and a pair of second stud bolts $40_2$ for fastening the cylinder block 52, the cylinder head 53, and the holder 57 together to the crankcase 51.

Each of the stud bolts $40_1$, $40_2$ has male threaded portions 44, 46 formed at the bottom end portion and the top end portion which are both end portions of its shaft portion 42 and the bottom end portion is screwed into the threaded hole 34 formed in the crankcase 51.

One of the first stud bolts $40_1$ and one of the second stud bolts $40_2$ are screwed into the threaded holes 34 formed in one half crankcase 51a and the other first stud bolt $40_1$ and the other second stud bolt $40_2$ are screwed into the threaded holes 34 formed in the other half crankcase 51b.

Each first stud bolt $40_1$ is passed through the through holes 60, 62 which are formed in the cylinder block 52 and the cylinder head 53, respectively, and a nut 65 is screwed on its male threaded portion 46 protruding upward from the top end surface of the cylinder head 53. Each second stud bolt $40_2$ is passed through the through holes 61, 63 64 which are formed in the cylinder block 52, the cylinder head 53, and the holder 57, respectively, and a nut 66 is screwed on its male threaded portion 46 protruding upward from the top end surface of the cylinder holder 57.

Here, in order to reduce the weight of the internal combustion engine $E_3$, the cylinder block 52, the crankcase 51, and the cylinder head 53 are molded of a molding material made of a light metal base alloy, for example, an aluminum base alloy. The allowable stresses of the cylinder block 52, the crankcase 51, and the cylinder head 53 are set at less values than the allowable stresses of the respective stud bolts $40_1$, $40_2$ molded of a molding material, for example, made of an iron base alloy.

The threaded hole 34 having the center axis L2 orthogonal to the mating face 67 of the crankcase 51 and the cylinder block 52 and having a closed end has a female threaded portion 35 where a female thread is formed and a non-threaded portion 36 between the female threaded portion 35 and the innermost surface 37. Each of the respective stud bolts $40_1$, $40_2$ has the center axis L3 orthogonal to the mating face 67.

Referring to FIG. 3 in combination, in a state where the crankcase 51 as a first member to be fastened is fastened to the cylinder block 52 as a second member to be fastened with four stud bolts $40_1$, $40_2$, the male threaded portions 44 of the respective stud bolts $40_1$, $40_2$ are screwed into the female threaded portions 35 of the threaded holes 34 in the screwed portions R.

Here, the screwed portion R, the non-screwed portion 35f and the hollow portion 38 are the same as those in the first embodiment. Further, as is the case with the first embodiment, in the male threaded portion 44, the hole 45 constructing a hollow portion in the male threaded portion is formed at a position overlapping the screwed end portion Ra of the female threaded portion 35 in the direction of the center axis L3, that is, in the axial direction A2 to form the low-rigidity portion 44b.

According to this third embodiment of the present invention, as to the respective stud bolts $40_1$, $40_2$, the same following operation and effect as the journal bolt 40 in the first embodiment can be produced.

That is, when the internal combustion engine $E_3$ is operated, the combustion load produced by the combustion of the air-fuel mixture in the combustion chamber is applied upward in FIG. 5 to the cylinder head 53. At the same time, the combustion load is applied downward in FIG. 5 to the crankshaft 55 via the piston and the connecting rod and further to the crankcase 51.

On the basis of the combustion load which is an external force applied to the crankcase 51, its reactive force is applied as an axial load to the four stud bolts $40_1$, $40_2$ that fasten the cylinder block 52 and the crankcase 51 into one piece. At the same time, on the basis of the combustion load applied to the cylinder head 53, an axial load in the same direction as the reactive force is applied to the respective first stud bolt $40_1$ and on the basis of the combustion load applied to the holder 57 via the cylinder head 53, an axial load in the same direction as the reactive force is applied to the respective second stud bolts $40_2$.

At this time, as to the concentrated stress caused in the root-of-threaded portion 35e of the screwed end portion Ra, the same operation and effect as in the first embodiment are produced between the female threaded portion 35 of each of the threaded holes 34 formed in the crankcase 51 and the male threaded portion 44 of each of the stud bolts $40_1$, $40_2$.

Referring to reference symbols in the parentheses in FIG. 3 in combination, in the male threaded portion 44, the low-rigidity portion 44b having the hole 45 which is formed concentrically with the center axis L3 of the male threaded portion 44 and has a circular cross section is formed at the position where the male threaded portion 44 overlaps the screwed end portion Ra in the axial direction A2 and the screw thread 44a is formed at the low-rigidity portion 44b.

Hence, in the low-rigidity portion 44b, rigidity is reduced as compared with a case where the male threaded portion 44 is solid. For this reason, when an axial load based on the combustion load is applied to the stud bolts $40_1$, $40_2$, the low-rigidity portion 44b is elastically deformed with relative ease to relieve the load applied to the screw thread 35c of the screwed end portion Ra from the screw thread 44a of the male threaded portion 44, thereby reducing the concentrated stress caused at the root-of-threaded portion 35e of the screwed end portion Ra.

Further, since the hole 45 is circular in cross section, the load applied to the screw thread 35c of the screwed end portion Ra from the screw thread 44a of the male threaded portion 44 is uniformly relieved in the peripheral direction with respect to the screwed end portion Ra to reduce the concentrated stress uniformly in the peripheral direction of the screw thread 35c of the screwed end portion Ra. Hence, this facilitates the strength designing of the crankcase 51.

Still further, the hole 45, which is means for relieving the load applied to the screwed end portion Ra from the male threaded portion 44 is formed in each of the stud bolts $40_1$, $40_2$. Hence, the hollow portion 38 of the threaded hole 34 which is formed in the crankcase 51 having less allowable stress than the allowable stresses of the stud bolts $40_1$, $40_2$ so as to reduce the concentrated stress does not need to be enlarged or can be made as small as possible.

For this reason, this can maintain the strength of the crankcase 51 or enhance the strength of the crankcase 51 and hence can secure the desired strength of the crankcase 51 without increasing the size and weight of the crankcase 51 and by extension the internal combustion engine $E_3$.

A modified construction in an embodiment in which a portion of the embodiments described above is modified will be described.

While the second bearing portion is constructed of the bottom journal supporting wall integrally formed with the bottom crankcase in the first embodiment, the second bearing potion may be bearing caps which are parts separate from each other.

While the crankcase is divided into left and right parts in the third embodiment, the crankcase may be divided by a plane including the rotary center line of the crankshaft and orthogonal to the cylinder axis, in other words, may be divided into upper and lower parts.

While the bolts in accordance with the invention fasten the bearing portions of the crankshaft of the internal combustion engine or the crankcase to the cylinder block, the bolts may fasten two arbitrary members to be constructed which construct the internal combustion engine and further may fasten two arbitrary members to be fastened of the internal combustion engine.

Although the present invention has been described herein with respect to a limited number of presently preferred embodiments, the foregoing description is intended to be illustrative, and not restrictive. Those skilled in the art will realize that many modifications of the preferred embodiments could be made which would be operable. All such modifications, which are within the scope of the claims, are intended to be within the scope and spirit of the present invention.

Having thus, described the invention, what is claimed is:

1. A bolt for use in fastening a first member to a second member;

said bolt comprising a male threaded portion for insertion into a female threaded portion of a hole formed in the first member, the threaded portion comprising a substantially uniform, continuous thread which extends over the entire threaded portion;

said bolt comprising a bolt head and a solid unthreaded portion, the unthreaded portion extending between the bolt head and the threaded portion, the unthreaded portion having a length which is at least as long as that of the threaded portion;

wherein the bolt is adapted to receive an axial load based on an external force applied to the first member;

wherein the male threaded portion comprises a low-rigidity portion, in which a hollow portion is formed concentric with a center axis of the male threaded portion and substantially circular in a cross section; and wherein said hollow portion is formed at a position intended to be placed overlapping part of a screwed portion formed where the male threaded portion is screwed into the female threaded portion in an axial direction.

2. An internal combustion engine comprising a crankcase and a crankshaft rotatably supported by a first bearing portion provided on the crankcase and a second bearing portion fastened to the first bearing portion with a bolt;

wherein said bolt comprises a male treaded portion screwed into a female threaded portion of a threaded hole formed in the first bearing portion, wherein an allowable stress of the first bearing portion is less than an allowable stress of the bolt, wherein an axial load based on an combustion load applied to the first bearing portion is applied to the bolt, and wherein the male threaded portion has a low-rigidity portion, in which a hollow portion concentric with a center axis of the male threaded portion and shaped substantially circular in a cross section is formed, formed at a position overlapping a screwed end portion of a screwed portion where the male threaded portion is screwed into the female threaded portion in an axial direction.

3. The internal combustion engine of claim 2, wherein the bolt is formed from a ferrous metal, and wherein the first bearing portion is formed from a metal comprising aluminum.

4. An internal combustion engine comprising a cylinder block fastened to a crankcase rotatably supporting a crankshaft, with a bolt having a male threaded portion screwed into a female threaded portion of a threaded hole formed in the crankcase, wherein an allowable stress of the crankcase is less than an allowable stress of the bolt, wherein an axial load based on an combustion load applied to the crankcase is applied to the bolt, and wherein the male threaded portion comprises a low-rigidity portion, in which a hollow portion concentric wit a center axis of the male threaded portion and substantially circular in a cross section is formed at a position overlapping a screwed end portion of a screwed portion, where the male threaded portion is screwed into the female treaded portion in an axial direction.

5. The internal combustion engine of claim 4, wherein the bolt is formed from a ferrous metal, and wherein the crankcase is formed from a metal comprising aluminum.

6. A threaded fastener for use in connecting engine components together, said fastener comprising:

a head portion;

a solid cylindrical, unthreaded body portion attached to the head portion;

a substantially cylindrical end portion integrally attached to the unthreaded body portion, said end portion having a substantially uniform, continuous male thread formed therearound and extending along the entire length of the end portion, the end portion having a coaxial cylindrical bore formed therein with a substantially circular cross-sectional shape;

wherein the portion has a length which is at least as long as the length of the end portion and wherein the fastener is adapted to withstand an axial stress applied thereto.

7. The fastener of claim 6, wherein the end portion comprises a tip having a conically tapered hole therein in communication with the cylindrical bore.

8. The fastener of claim 6, wherein the fastener is a bolt.

9. The fastener of claim 6, wherein the fastener is a stud.

10. The fastener of claim 6, wherein the fastener is formed from a ferrous metal, and is adapted to be used with an engine component formed from a metal comprising aluminum.

11. The fastener of claim 6, wherein the area of the end portion surrounding the cylindrical bore is an elastically deformable low-rigidity portion.

* * * * *